(12) United States Patent
Rushing

(10) Patent No.: US 6,742,271 B1
(45) Date of Patent: Jun. 1, 2004

(54) RETRACTABLE STRAIGHTEDGE FRAMING SQUARE INTEGRABLE TO A LEVEL

(76) Inventor: Donald Jeffrey Rushing, 313 Lineview Dr., Matthews, NC (US) 28104

( * ) Notice: Subject to any disclaimer, the term of this patent is extended or adjusted under 35 U.S.C. 154(b) by 0 days.

(21) Appl. No.: 10/322,031

(22) Filed: Dec. 17, 2002

(51) Int. Cl.[7] .............................. G01C 9/28; B43L 7/10
(52) U.S. Cl. ........................ 33/465; 33/451; 33/471; 33/500
(58) Field of Search .................. 33/465, 452, 471, 33/468, 469, 475, 495, 496, 497, 498, 499, 500, 451

(56) References Cited

U.S. PATENT DOCUMENTS

| | | | | |
|---|---|---|---|---|
| 596,818 | A | * 1/1898 | Moore ........................ | 33/343 |
| 1,034,068 | A | * 7/1912 | Bley ........................... | 33/469 |
| 1,242,740 | A | * 10/1917 | Taylor ......................... | 33/497 |
| 1,324,411 | A | * 12/1919 | Rosenholm .................. | 33/342 |
| 1,791,817 | A | * 2/1931 | Johnston et al. ............. | 33/499 |
| 1,806,396 | A | * 5/1931 | Hartwell ...................... | 33/451 |
| 3,832,782 | A | 9/1974 | Johnson et al. .............. | 33/451 |
| 4,144,650 | A | * 3/1979 | Rawlings et al. ............. | 33/451 |
| 4,327,501 | A | * 5/1982 | Hurt ............................ | 33/451 |
| 4,481,720 | A | * 11/1984 | Sury ............................ | 33/451 |
| 4,562,649 | A | * 1/1986 | Ciavarella .................... | 33/419 |
| 4,745,689 | A | * 5/1988 | Hiltz ........................... | 33/451 |
| 5,233,760 | A | 8/1993 | Patterson .................... | 33/376 |
| 5,452,522 | A | 9/1995 | Kook et al. .................. | 33/451 |
| 5,535,523 | A | 7/1996 | Endris ......................... | 33/371 |
| 5,586,395 | A | * 12/1996 | Malczewski ................. | 33/471 |
| 5,675,901 | A | 10/1997 | Young ......................... | 33/451 |
| 5,713,135 | A | 2/1998 | Acopulos .................... | 33/451 |
| 5,839,201 | A | 11/1998 | Young ......................... | 33/451 |
| 6,122,834 | A | 9/2000 | Rester ......................... | 32/474 |
| 6,134,795 | A | 10/2000 | Hitchcock ................... | 33/451 |
| 6,543,144 | B1 | * 4/2003 | Morin ......................... | 33/27.032 |

FOREIGN PATENT DOCUMENTS

| | | | | |
|---|---|---|---|---|
| GB | 2298485 A | * 9/1998 | ............ | G01C/9/25 |
| WO | WO 98/45126 | 10/1998 | | |

* cited by examiner

*Primary Examiner*—Diego Gutierrez
*Assistant Examiner*—R. Alexander Smith
(74) *Attorney, Agent, or Firm*—Dougherty, Clements & Hofer

(57) ABSTRACT

The invention is a masonry tool that is a framing square with a retractable straightedge, where the framing square can be fitted to a level. The major components of the invention are a foldable flat straightedge, a mounting bar and housing which seats a notched disk that rotates on an axial shaft that is joined to the straightedge, a finger activated switch that moves a spring loaded slideable pin that clicks into a notch on the disk corresponding to an angle, and fastening components and elements for longitudinally affixing the mounting bar and housing to the end of the level. The retractable straightedge, when unlocked, can be rotated from a retracted position to a reversibly locked right angle position, and vice versa.

42 Claims, 5 Drawing Sheets

RETRACTABLE STRAIGHTEDGE FRAMING SQUARE INTEGRABLE TO A LEVEL

FIELD OF THE INVENTION

The present invention relates generally to hand tools used in construction, and, more particularly, to masonry tools for determining that masonry construction is plumb, square and level.

BACKGROUND OF THE INVENTION

A large number of carpentry tools have been invented to measure whether framing elements such as studs, rafters or joists are level, square and plumb. Masonry construction requires similar measurements, but in contrast to framing, masonry construction utilizes smaller individual elements such as bricks, stones, and blocks; and carpentry tools either are improperly sized or do not contain the correct combination of tools to optimally be used for masonry. With masonry there is a greater reliance on craftsmanship to achieve satisfactory results. For instance, when building a chimney out of brick, the brick layer must keep the construction straight, level and square. A small error at the beginning, can result in a significant error in the completed chimney. A 30 foot chimney deflected just 3° from plumb will be deflected 1.5 feet at the top of the chimney.

What is needed is a masonry tool that can confirm that construction is square, plumb, and that an individual element such as a brick or a block is level, and a tool that can confirm that a composite of individual elements is plumb and level.

DESCRIPTION OF THE PRIOR ART

Applicant is aware of the following U.S. Patents concerning framing squares:

| PATENT NO. | INVENTOR | TITLE |
| --- | --- | --- |
| U.S. Pat. No. 6,134,795 | James Hitchcock | MULTI-PURPOSE HAND TOOL |
| U.S. Pat. No. 6,122,834 | Glenn Rester | COMBINATION FRAMING AND SPEED SQUARE |
| U.S. Pat. No. 5,839,201 | James Young | SEGMENTED, COMBINATION LEVEL AND SQUARE HAVING A ROTATING JOINT |
| U.S. Pat. No. 5,713,135 | Brad Acopulos | MULTI-PURPOSE CARPENTRY MEASURING DEVICE |
| U.S. Pat. No. 5,675,901 | James Young | SEGMENTED, COMBINATION LEVEL AND SQUARE HAVING A ROTATING JOINT |
| U.S. Pat. No. 5,535,523 | Matthew Endris | CARPENTER'S SQUARE |
| U.S. Pat. No. 5,452,522 | Kook et al. | CALIBRATED BEVEL SQUARE WITH INTEGRATED ELECTRONIC LEVEL AND PLUMB |
| U.S. Pat. No. 5,233,760 | E. Patterson | ANGULAR MEASURING MECHANISM |
| U.S. Pat. No. 3,832,782 | Johnson et al. | ALL-CRAFT LEVEL |
| WO 98/45126 | James Young | A SEGMENTED, COMBINATION LEVEL AND SQUARE HAVING A ROTATING JOINT |

SUMMARY OF THE INVENTION

The invention is a masonry tool useful for confirming that masonry work is square, level and plumb. The invention is an integrable framing square with an articulatable retractable straightedge, where the integrable framing square can be retrofitted to a level. As an article of manufacture, the invention is a framing square with an articulatable retractable straightedge integral to a level, where the articulatable retractable straightedge is rotatable to a right angle. Additional angles, such as 45° and 135°, can also be designed into the invention. The articulatable element of the invention is substantially a retractable straightedge that is locked, except when rotating to a new position. When retracted, the straightedge is substantially flush or slightly recessed beneath an edge of the level. The retractable straightedge is unlocked by depressing a finger activated lock which disengages a spring loaded lock. Without the need for further finger pressure, the retractable straightedge can be folded out until it snaps into a right angle position, where it is locked. The process can be reversed by simply depressing the finger activated lock and rotating the retractable straightedge back against the level, where it re-locks. Alternatively, the retractable straightedge can be folded out further to 135° (90°+ 45°). The process can be reversed by simply depressing the finger activated lock, and rotating the retractable straightedge back against the level, where it re-locks.

Preferably, the retractable straightedge is a flat bar marked with rulings and indicia. In the right angle position the flat bar creates a visually enhancing perspective of any deviation from either a pure right angle, or a deviation from plumb. The retractable straightedge has a length that is sufficient to determine that a brick or block is square and level. For a typically concrete or clay brick, the straightedge should have a minimum length of approximately 0.5 feet and maximum length of 4 feet. A preferred length is 1 foot to 1.5 feet, or approximately the length of at least one block or brick. Straightedges longer than 4 feet are subject to deflecting under their own weight unless especially designed, and they are rather unhandy.

The retractable straightedge pivots at the end of a housing which is mounted to an end of the level. The housing contains a rotatable lockable mechanism which enables rotation and locking of the articulatable retractable straightedge. The rotatable lockable mechanism is joined to the articulatable retractable straightedge, so that when the retractable straightedge is articulated, the mechanism rotates accordingly. The rotatable lockable mechanism is substantially a notched disk, where a notch position corresponds to an angle of rotation. The notched disk is mounted on an axial shaft which is affixed to the housing. There is optionally at least one low friction washer mounted between a side of the housing and the notched disk. The housing also contains a finger activated lock, wherein the finger activated lock is connected to a spring loaded slideable pin which can slide into a notch on the disk. The spring loaded slideable pin is secured to a side of the housing a mounting. In its at rest position, the pin impinges one of the notches, and the disk cannot rotate, and hence the articulatable retractable straightedge is secured. Depressing the finger activated lock causes the spring to compress and the slideable pin to move out of the notch, therein freeing the disk to rotate. The framing square optionally includes a faux cover that snaps onto a corner of the framing square. The faux cover helps prevent dirt and mortar and other detritus form getting into the housing and interfering with the operation of the working/moving elements of the framing square, and also serves to extend the functional length of the level's straightedge and squareness.

In a typical usage, the retractable straightedge is folded out from the level to a right angle position, and at that point the pin encounters the right angle notch and slides into the notch, therein stopping any further rotation. The retractable straightedge can be rotated another 45° by again depressing the finger activated lock, which shifts the spring loaded slideable pin out of the right angle notch, and rotating the retractable straightedge until the pin encounters another notch, wherein it will slide into the notch locking the retractable straightedge in the 135° angle (90°+45°). The action of the slideable pin moving into a notch creates a sound that is a single click.

By addition of other additional notches, further angles could be selected. A potential downside to the addition of notches is that it will become less clear to the user exactly how many clicks the retractable straightedge element must rotate in order to achieve a 90° and a 45° angle. By selecting only three positions, or three notches, the limited number of selectable angles lessens the probability of error by the user.

The framing square has a mounting bar integral with the housing, such that the framing square can be mounted to a level. The housing affixes collinearly, abutting to the end of the level and the mounting bar attaches to a longitudinal edge side of the level. The level can be produced with the framing square, or an existing level can be fitted with the framing square. In the latter case a preferred method of affixing the housing is to use fastening elements, such as spikes or studs, which project from a front portion of the housing of the housing and intersect with the butt end of the level. Spikes seated in the front portion of the housing can be press fitted into a wooden level, and aluminum level typically have a rubber pad fastened to the end of the level with one or more screws and removing the rubber pad exposes holes for receiving studs. The mounting bar is attached using conventional fastening components such as screws. The mounting bar has countersunk holes so that the fastening components are flush or slightly recessed. The length of the mounting bar is preferably sufficient to extend the entire length of the longitudinal edge side of the level.

The invention provides for an alternative fabrication for a contractor's level with a squaring frame with a retractable straightedge, where the squaring frame is integral to an end of the level. The squaring frame enables the measurement of both 90° and 45° angles. The framing square is fitted to a level having a partially cutaway portion of a distal end of the level. With the alternative fabrication, the partially cutaway portion of the level forms one of the sides of the housing of the framing square. The opposing side of the housing is fastened to the partially cutaway portion of the level.

OBJECTS OF THE INVENTION

The principal object of the present invention is to provide an article of manufacture that is an integrable framing square with a retractable straightedge that can be fitted to a level.

A further object of this invention is to provide a framing square having a retractable square that is integral to a level.

Another object of the invention is to provide an apparatus, comprising a level and framing square, that is particularly well suited for use with masonry construction.

Another object of the invention is to provide an apparatus that is robust and easy to use.

Another object of the invention is to provide a level with a framing square, wherein the straightedge of the framing square is collapsible, such that the framing square can be reversibly taken out of service.

Another object of the invention is to provide a framing square which can be fitted to a level, therein becoming integral with the level.

BRIEF DESCRIPTION OF THE DRAWINGS

The foregoing and other objects will become more readily apparent by referring to the following detailed description and the appended drawings in which.

DETAILED DESCRIPTION

The invention is a framing square that can be fitted to a level where the framing square is foldable and specifically has a retractable straightedge that is substantially a ruler or a similar device which can be rotated away from the level to a position 90° from the edge of the level or alternatively another 45° for a total of 135° from the edge of the level.

Figure 1:
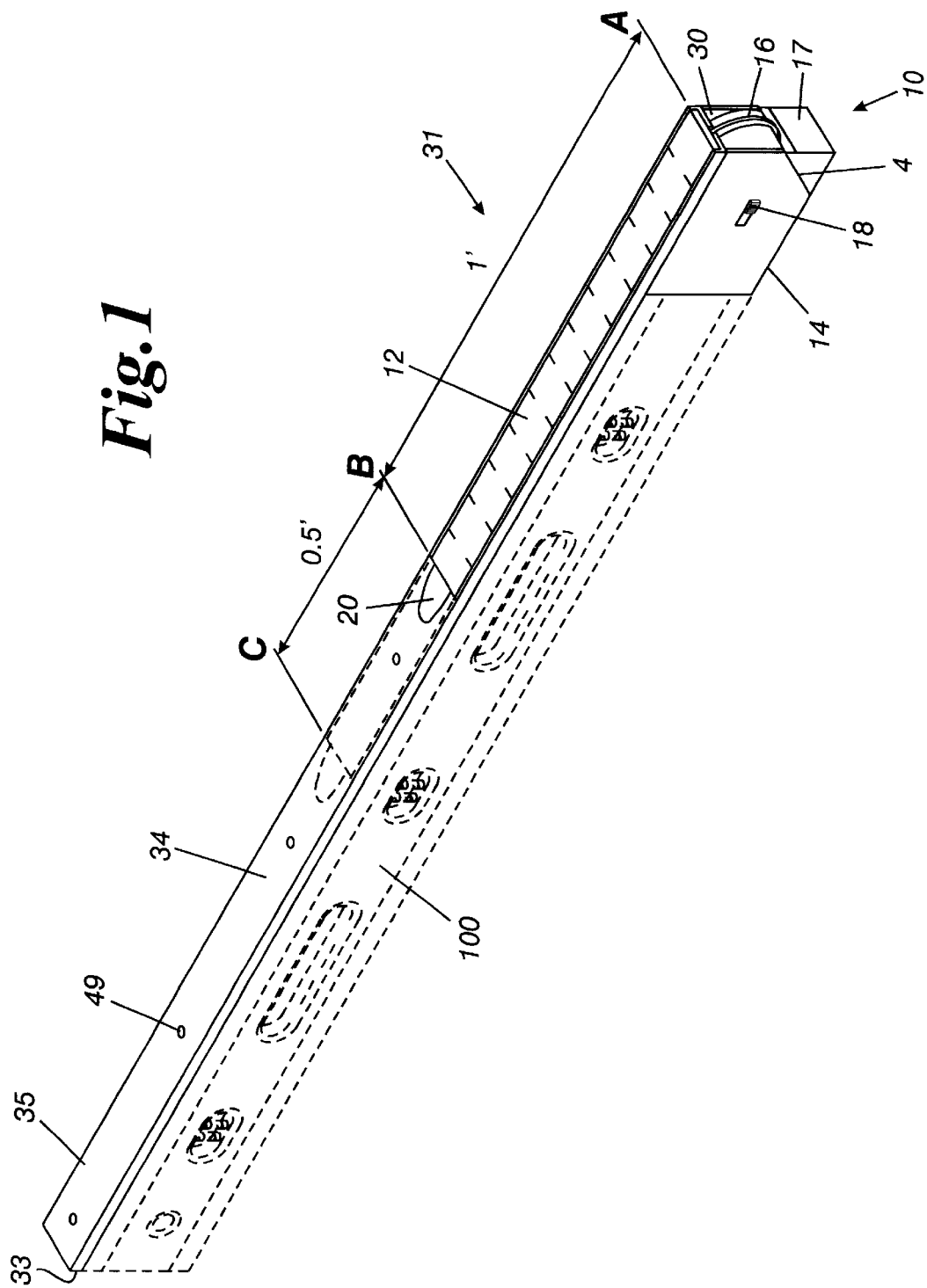
FIG. 1 is an isometric view of an integral framing square having a retractable straightedge. The integrable framing square is attached to the end of a level, which is shown in ghost.

Referring to FIG. 1, the integrable framing square 10 with the retractable straightedge 12 is shown attached to a level 100. The level is shown in ghost with dashed lines. The retractable straightedge is attached to a notched disk 16 which is part of a rotatable lockable mechanism. As shown in FIG. 1, the straightedge is folded against mounting bar 34. Mounting bar 34 is integral to the housing 14, therein forming a unified framing square 10 which is attached to the level 100. As shown in FIG. 1, the mounting bar has a uniform edge thickness 33, and a tiered facial thickness, wherein the mounting bar is partially cut away to accommodate the retractable straightedge, producing a substantially flat surface that has very few voids or edges where dirt or mortar can collect. There are substantially three sections. The thickest section of the mounting bar is exposed surface 35, and the thinnest section is recessed surface 31. The recessed surface 31 extends the length of the straightedge 12. If the straightedge is one foot, as shown by the sectional line A–B, then one foot of the mounting bar is formed with the recessed thickness. In FIG. 1, short dashed lines show a straightedge that is 1.5 feet in ghost, as indicated by sectional line A–C. A 1.5 feet straightedge would correspondingly necessitate that the mounting bar have recessed surface 31 with a sectional length of 1.5 feet. In the area of a finger lift 20, only a narrow portion of the width of the mounting bar is cut away, such that the portion slopes from the exposed surface 35 to the recessed surface 31. The oblique corner 4 of the housing 14 is fitted with a faux cover 17, which can be reversibly removed enabling the straightedge 12 to be rotated to 135°, and the faux keeps dirt and mortar away from the inner workings of the invention.

Figure 2:
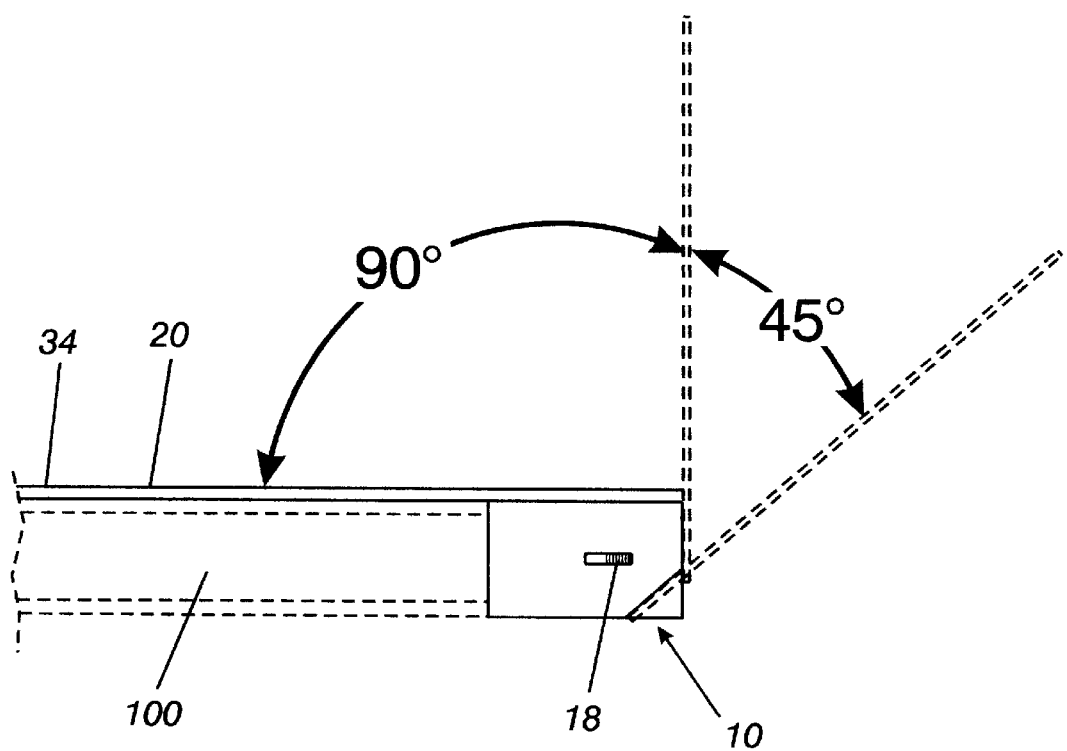
FIG. 2 is a side view of the invention illustrating that the retractable straightedge can fold out to 90° (right angle) or another 45° for a total of 135°.

The retractable straightedge, as illustrated in FIG. 1, is locked in a position flattened against the mounting bar 34. Depressing a finger activated switch 18 releases the straightedge 12 so that it may rotate outward to a 90° angle as shown in FIG. 2. Depressing the finger activated switch releases the lock again, and the straightedge 12 can be rotated another 45° for a total of 135°, where it is locked into position. The mounting bar in FIG. 1 has a finger lift 20 for initiating movement away from the level.

Figure 3:
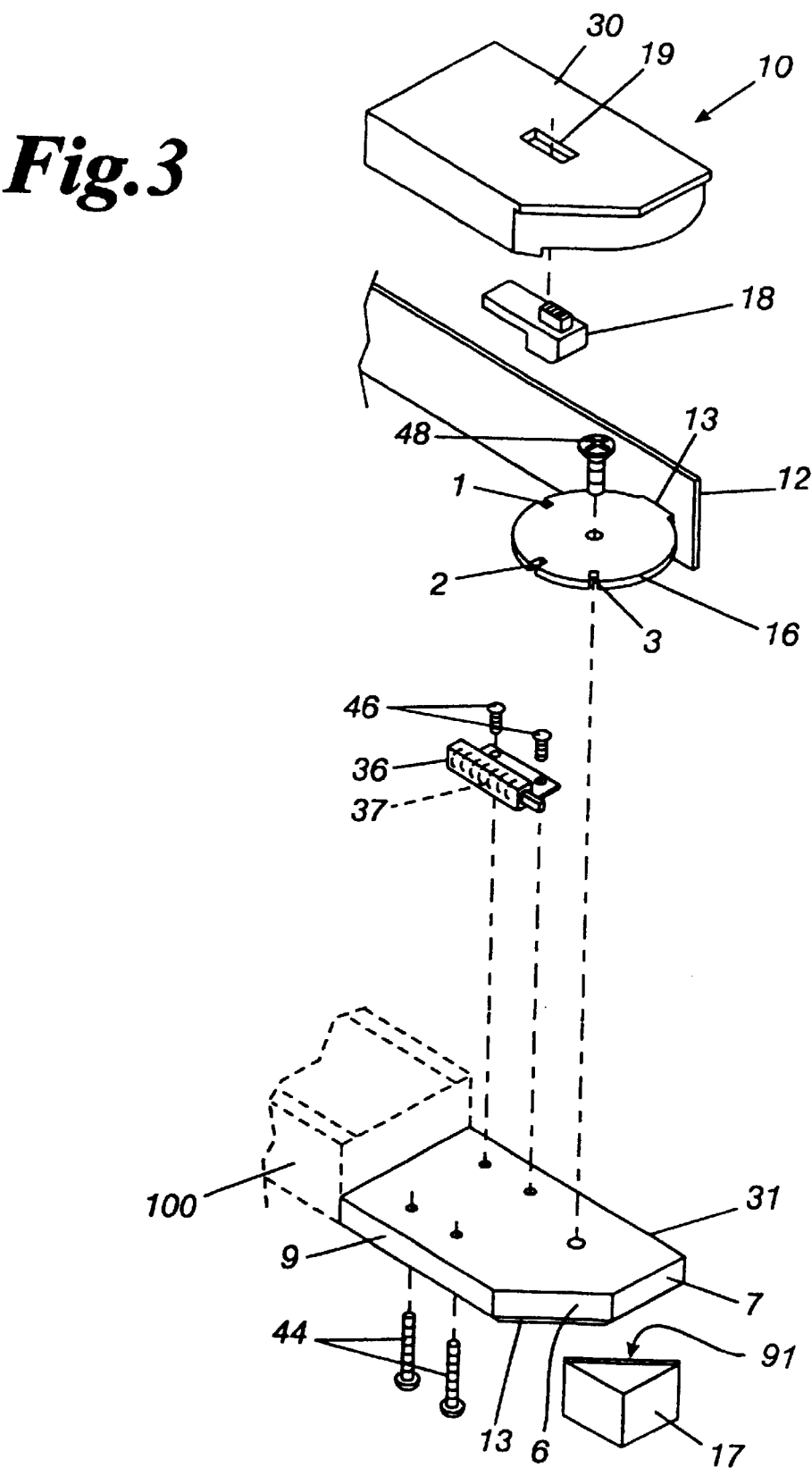
FIG. 3 is an exploded view showing all of the components of an integral framing square with a retractable straightedge, wherein a conventional level is fabricated to include the framing square with a retractable straightedge.
Figure 4:
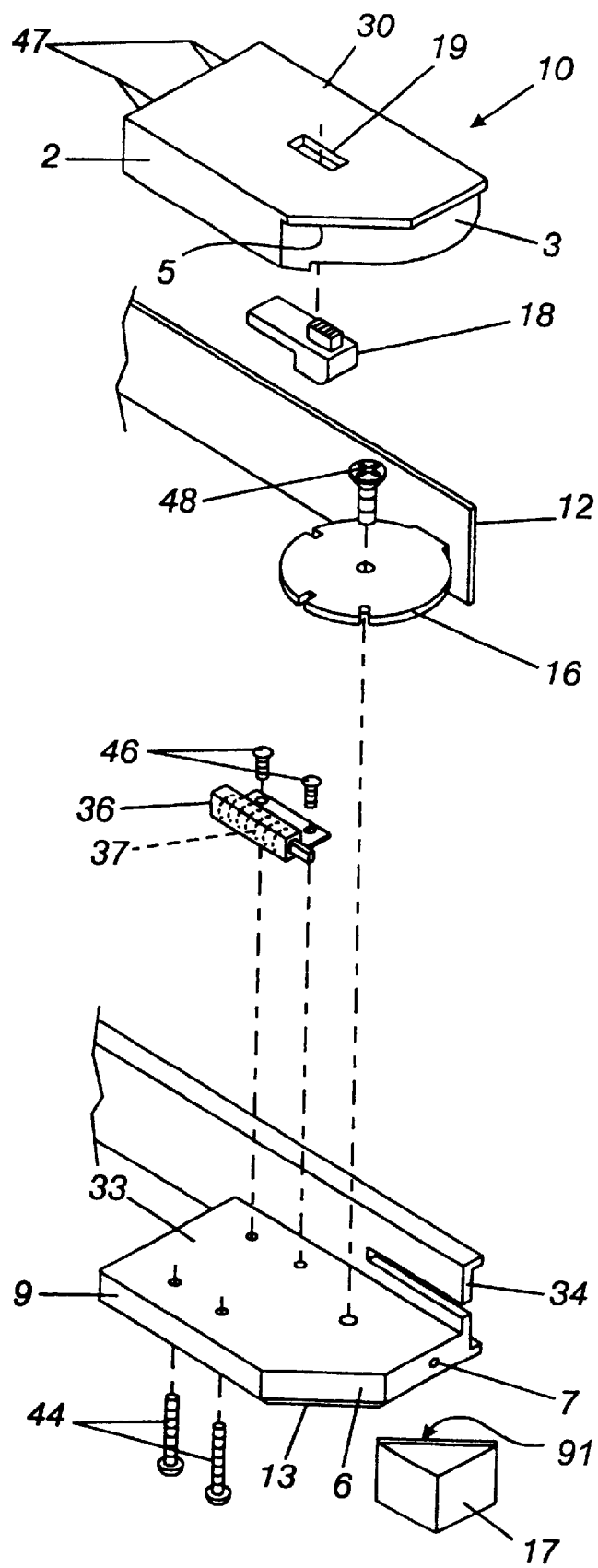
FIG. 4 is an exploded view of the invention. The invention also includes a faux cover that can be removed for wide angle rotations.

FIG. 4 is an exploded view of the integrable framing square 10. The straightedge 12 is joined to the notched disk 16. The notched disk 16 rotates on axial shaft 48 that secures the disk 16 to a first side of the housing 33. The first side of the housing 33 is integral to the mounting bar 34. The bottom portion 9 and the back portion 7 of the first side 33 are joined by the oblique portion 6, which has a lip 13 for receiving and retaining the faux cover 17, which has a rim 91 as shown in FIGS. 3 and 4. An opposing side 30 has functionally equivalent portions 2, 3 and 5. The finger activated switch 18 projects through aperture 19 on the opposing side 30 of the housing 14. The finger-activated switch 18 is linked to a slideable pin 36, which is spring loaded 37. The slideable pin 36, in a resting position, is engaged with the notched disk 16. The slideable pin is secured to the first side 33 of the housing with screws 46. The opposing side 30 of the housing is secured to the first side with screws 44 forming the oblique corner 4 shown in FIG. 1. The notched disk 16 can rotate when not engaged by the slideable pin 36. Notched disk 16 is notched at three locations. The first notch 1 corresponds to the fully retracted (0° angle) position for the straightedge; the second notch 2 is the 90° position, and the third notch 3 corresponds to the 135° (90°+45°) position. Except when depressed by the finger-activated switch 18, the spring loaded slideable pin 36 is in contact with the disk 16. When the retractable straightedge 12 is at either 135°, 90° or 0° angle, the pin 36 will be in the notches 3, 2, 1 respectively, therein preventing movement. The retractable straightedge 12 is joined to the disk at 13, which is approximately 180° from the second notch 2.

Figure 5:
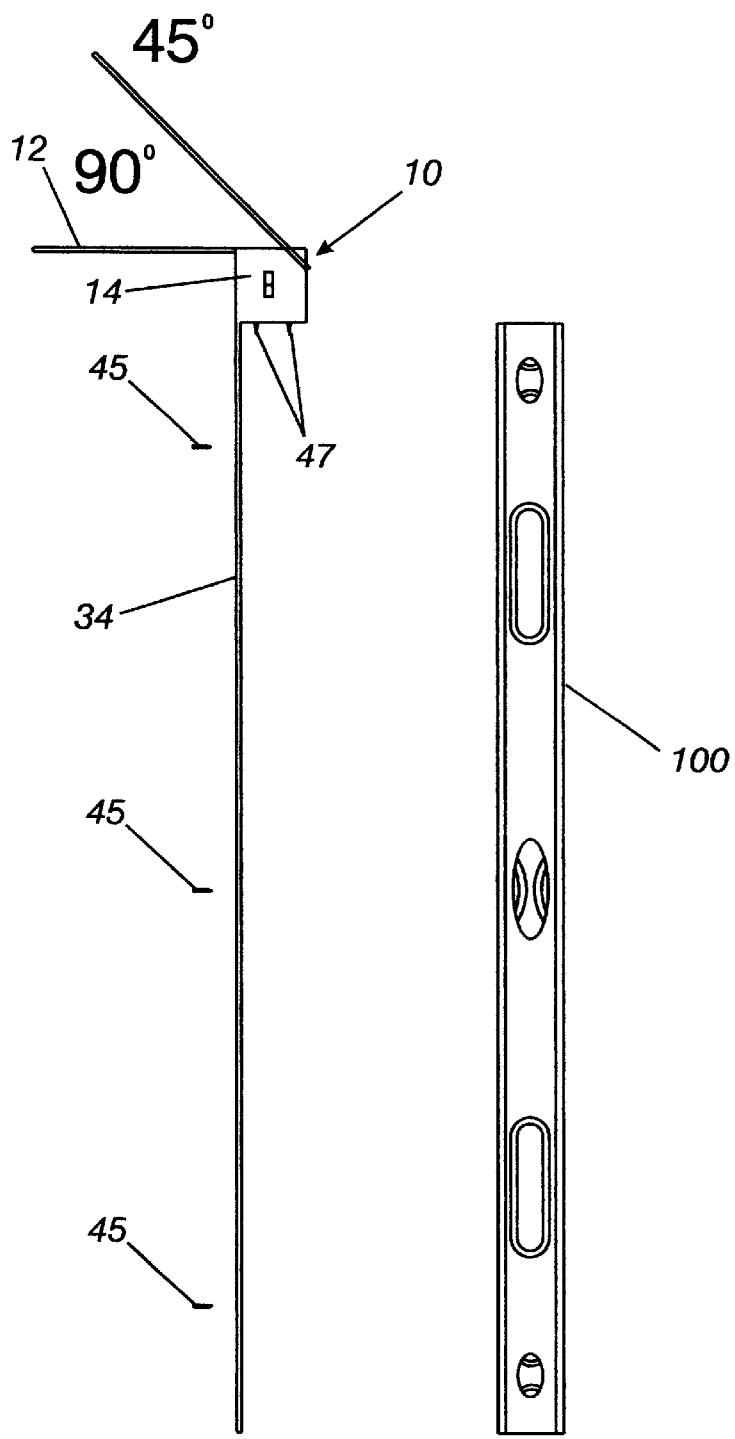
FIG. 5 is a side view illustrating how the integrable framing square is fitted to a level. The fastening components are screws which attach the mounting bar to an edge of the level and fastening elements that intersect and align the housing with the end of the level.

FIG. 5 illustrates how the invention 10 can be fitted to an existing level 100. The framing square 10 has a mounting bar 34 which is integral to a housing 14. The mounting bar is attached to the edge side of the level 100. The mounting bar has countersunk holes 49 and the housing has fastening elements, such as spikes or studs 47, which project from a front portion of the housing and intersect with the butt end of the level. Spikes implanted in the front portion of the housing can be press fitted into the butt end of the level. Fastening components for the mounting bar 45 attach the integrable squaring frame 10 through the countersunk holes 49 of FIG. 1.

ALTERNATIVE EMBODIMENT

The invention provides a contractor's level, as shown in FIG. 3, with a squaring device integrated at one end of the level, for the purpose of measuring both a 90° and a 45° angle. The framing square 10 is fitted to a level 100 having a partially cutaway portion 31 of a distal end of a level. With this fabrication, the partially cutaway portion of the level forms one of the sides 31 of the housing of the framing square. The opposing side 30 of the housing is fastened to the partially cutaway portion 31 of the level. No mounting bar 34 nor longitudinally fastening components 46 are required for the alternative embodiment.

SUMMARY OF THE ACHIEVEMENT OF THE OBJECTS OF THE INVENTION

From the foregoing, it is readily apparent that I have invented an apparatus that is an integrable framing square with a retractable straightedge that can be fitted to a level, wherein the apparatus is particularly well suited for use with masonry construction, in that it is robust and easy to use, appropriately sized for masonry construction, and can serve as framing square or a level or work in combination, wherein the straightedge of the framing square is collapsible, such that the framing square can be reversibly taken out of service.

It is to be understood that the foregoing description and specific embodiments are merely illustrative of the best mode of the invention and the principles thereof, and that various modifications and additions may be made to the apparatus by those skilled in the art, without departing from the spirit and scope of this invention, which is therefore understood to be limited only by the scope of the appended claims.

What is claimed is:

1. A framing square integral to a level comprising:
   a) an articulatable retractable straightedge that, when unlocked, can be rotated from a reversibly locked retracted position to a reversibly locked right angle position, and where, in the retracted position, a top surface of the articulatable retractable straightedge is substantially flush with an edge of a level and where, in the right angle position, a bottom surface of the articulatable retractable straightedge is orthogonal to the edge of the level;
   b) a housing for a rotatable lockable mechanism which enables rotation and locking of the articulatable retractable straightedge, where said rotatable lockable mechanism is joined to the articulatable retractable straightedge, wherein said housing has an oblique corner, and said oblique corner is fitted with a faux cover which is reversibly removable;
   c) a finger activated switch; and
   d) a level with a partially cutaway portion of the distal end of the level forming the side of the housing and an opposing side of the housing having at least one fastening component for affixing the opposing side of the housing to the level.

2. The framing square integral to a level according to claim 1, wherein said articulatable retractable straightedge can additionally be rotated from the reversibly locked retracted position to a reversibly locked 135° angle position (90°+45°), or from the right angle position to the 135° angle position, and vice versa.

3. The framing square integral to a level according to claim 2, wherein said rotatable lockable mechanism is a notched disk and a spring loaded slideable notch engaging pin that is actuated by the finger activated switch, where each notch corresponds to an angle of rotation.

4. The framing square integral to a level according to claim 3, wherein said notched disk is free to rotate when the finger activated switch compresses the slideable notch engaging pin against the spring, thereby displacing the pin out of the notch.

5. The framing square integral to a level according to claim 3, wherein said notched disk is mounted on an axial shaft that is on the distal end of the level.

6. The framing square integral to a level according to claim 3, wherein said notched disk has a first notch, a second notch and a third notch, where the first notch is determinative of the retracted position, the second notch is determinative of the right angle position, and the third notch is determinative of the 135° angle position.

7. The framing square integral to a level according to claim 1, wherein said articulatable retractable straightedge is a flat bar ruled and marked with indicia.

8. An integrable framing square for attachment to a level, comprising:
   a) an articulatable retractable straightedge that is reversibly rotatable from a retracted position to a pre-selected angled position;
   b) a mounting bar and integral housing having at least one fastening element for longitudinally affixing the housing to the end of a level, wherein the mounting bar has a facial surface that is undercut sufficient to accommodate the thickness of the retracted straightedge, so that so that a surface on the retractable straightedge is flush with the facial surface of the mounting bar;
   c) a rotatable lockable mechanism engaging the articulatable retractable straightedge that enables rotation and locking of the articulatable retractable straightedge in a desired orientation;
   d) locking means for locking and unlocking of the rotatable lockable mechanism, such that the articulatable retractable straightedge can, reversibly, be rotated from the locked retracted position to the locked angled position;
   e) fastening components for attaching the mounting bar to an edge side of the level; and
      whereby, when the articulatable retractable straightedge is attached to a level in the retracted position, a top surface of the articulatable retractable straightedge is substantially flush with or below an edge of the level.

9. The integrable framing square according to claim 8, wherein the pre-selected angled position is a right angle position.

10. The integrable framing square according to claim 9, wherein pre-selected angled position is additionally a 135° angle position (90°+45°).

11. The integrable framing square according to claim 8, wherein said rotatable lockable mechanism is a notched disk, where each notch corresponds to the pre-selected angled position, and a spring loaded slideable notch engaging pin that is actuated by the locking means.

12. The integrable framing square according to claim 11, wherein said notched disk is free to rotate when the locking means, which is a finger activated switch compresses the slideable notch engaging pin against the spring, thereby displacing the pin out of the notch.

13. The integrable framing square according to claim 11, wherein said notched disk is mounted on an axial shaft that is seated on a first side of the housing.

14. The integrable framing square according to claim 11, wherein said notched disk has a first notch, a second notch and a third notch three, where the first notch is determinative of the retracted position, the second notch is determinative of the right angle position, and the third notch is determinative of the 135° angle position.

15. The integrable framing square according to claim 8, wherein said articulatable retractable straightedge is a flat bar ruled and marked with indicia.

16. The integrable framing square according to claim 8, wherein the mounting bar includes a means for forming a finger lift for initiating rotation of the retractable straightedge.

17. The integrable framing square according to claim 8, wherein the at least one fastening element is implanted on a front side of the housing, where the at least one fastening element is a spike or a stud.

18. The integrable framing square according to claim 8, wherein the mounting bar has countersunk holes for the fastening components to attach the mounting bar to the edge side of the level, therein maintaining a substantially smooth flat surface.

19. An integrable framing square for attachment to a level, comprising:
   a) an articulatable retractable straightedge that is reversibly rotatable from a retracted position to a pre-selected angled position;
   b) a mounting bar and an integral housing having at least one fastening element for longitudinally affixing the housing to the end of a level, wherein said integral housing has an oblique corner, and said oblique corner is fitted with a faux cover which is reversibly removable;
   c) a rotatable lockable mechanism engaging the articulatable retractable straightedge that enables rotation and locking of the articulatable retractable straightedge in a desired orientation;
   d) locking means for locking and unlocking of the rotatable lockable mechanism, such that the articulatable retractable straightedge can, reversibly, be rotated from the locked retracted position to the locked angled position;
   e) fastening components for attaching the mounting bar to an edge side of the level; and
      whereby, when the articulatable retractable straightedge is attached to a level in the retracted position, a top surface of the articulatable retractable straightedge is substantially flush with or below an edge of the level.

20. The integrable framing square according to claim 19, wherein the pre-selected angled position is a right angle position.

21. The integrable framing square according to claim 20, wherein the pre-selected angled position is additionally a 135° angle position (90°+45°).

22. The integrable framing square according to claim 19, wherein said rotatable lockable mechanism is a notched disk, where each notch corresponds to the pre-selected angled position, and a spring loaded slideable notch engaging pin that is actuated by the locking means.

23. The integrable framing square according to claim 22, wherein said notched disk is free to rotate when the finger activated switch compresses the slideable notch engaging pin against the spring, thereby displacing the pin out of the notch.

24. The integrable framing square according to claim 22, wherein said notched disk is mounted on an axial shaft that is seated on a first side of the housing.

25. The integrable framing square according to claim 22, wherein said notched disk has a first notch, a second notch and a third notch, where the first notch is determinative of the retracted position, a the second notch is determinative of the right angle position, and the third notch is determinative of the 135° angle position.

26. The integrable framing square according to claim 19, wherein said articulatable retractable straightedge is a flat bar ruled and marked with indicia.

27. The integrable framing square according to claim 19, wherein the mounting bar has a facial surface that is undercut sufficient to accommodate the thickness of the retracted straightedge, so that a surface on the retractable straightedge is flush with the facial surface of the mounting bar.

28. The integrable framing square according to claim 19, wherein the mounting bar includes a means for forming a finger lift for initiating rotation of the retractable straightedge.

29. The integrable framing square according to claim 19, wherein the at least one fastening element is implanted on a front side of the housing, where the at least one fastening element is a spike or a stud.

30. The integrable framing square according to claim 19, wherein the mounting bar has countersunk holes for the fastening components to attach the mounting bar to the edge side of the level, therein maintaining a substantially smooth flat surface.

31. An integrable framing square for attachment to a level, comprising:
   a) an articulatable retractable straightedge that is reversibly rotatable from a retracted position to a pre-selected angled position;
   b) a mounting bar and integral housing having at least one fastening element for longitudinally affixing the housing to the end of a level, wherein the mounting bar has a channel for accommodating the retractable straightedge and includes a means for forming a finger lift for initiating rotation of the retractable straightedge;
   c) a rotatable lockable mechanism engaging the articulatable retractable straightedge that enables rotation and locking of the articulatable retractable straightedge in a desired orientation;
   d) locking means for locking and unlocking of the rotatable lockable mechanism, such that the articulatable retractable straightedge can, reversibly, be rotated from the locked retracted position to the locked angled position;
   e) fastening components for attaching the mounting bar to an edge side of the level; and
      whereby, when the articulatable retractable straightedge is attached to a level in the retracted position, a top surface of the articulatable retractable straightedge is substantially flush with or below an edge of the level.

32. The integrable framing square according to claim 31, wherein the pre-selected angled position is a right angle position.

33. The integrable framing square according to claim 32, wherein the pre-selected angled position is additionally a 135° angle position (90°+45°).

34. The integrable framing square according to claim 31, wherein said rotatable lockable mechanism is a notched disk, where each notch corresponds to the pre-selected angled position, and a spring loaded slideable notch engaging pin that is actuated by the locking means.

35. The integrable framing square according to claim 34, wherein said notched disk is free to rotate when the finger activated switch compresses the slideable notch engaging pin against the spring, thereby displacing the pin out of the notch.

36. The integrable framing square according to claim 34, wherein said notched disk is mounted on an axial shaft that is seated on a first side of the housing.

37. The integrable framing square according to claim 34, wherein said notched disk has a first notch, a second notch and a third notch, where the first notch is determinative of the retracted position, the second notch is determinative of the right angle position, and the third notch is determinative of the 135° angle position.

38. The integrable framing square according to claim 31, wherein said articulatable retractable straightedge is a flat bar ruled and marked with indicia.

39. The integrable framing square according to claim 31, wherein the channel is undercut sufficient to accommodate the thickness of the retracted straightedge, so that a surface on the retractable straightedge is flush with a facial surface of the mounting bar.

40. The integrable framing square according to claim 31, wherein the at least one fastening element is implanted on a front side of the housing, where the at least one fastening element is a spike or a stud.

41. The integrable framing square according to claim 31, wherein the mounting bar has countersunk holes for the fastening components to attach the mounting bar to the edge side of the level, therein maintaining a substantially smooth flat surface.

42. The integrable framing square according to claim 31, wherein said housing has an oblique corner, and said oblique corner is fitted with a faux cover which is reversibly removable.

* * * * *